United States Patent [19]

Hartung et al.

[11] Patent Number: 4,466,406

[45] Date of Patent: Aug. 21, 1984

[54] REGULATING DEVICE FOR CONTROL VARIABLES OF AN INTERNAL COMBUSTION ENGINE

[75] Inventors: Erwin Hartung, Stockstadt; Martin Klenk, Kirchberg; Heinz Möller, Stuttgart, all of Fed. Rep. of Germany

[73] Assignee: Robert Bosch GmbH, Stuttgart, Fed. Rep. of Germany

[21] Appl. No.: 282,193

[22] Filed: Jul. 10, 1981

[30] Foreign Application Priority Data

Jul. 10, 1980 [DE] Fed. Rep. of Germany ....... 3026097

[51] Int. Cl.$^3$ .................... F02D 5/00; F02D 37/02
[52] U.S. Cl. .................... 123/425; 123/435; 123/416; 123/487; 123/501; 73/35
[58] Field of Search .............. 123/425, 435, 419, 436, 123/416, 487, 501; 73/35

[56] References Cited

U.S. PATENT DOCUMENTS

| | | | |
|---|---|---|---|
| 2,470,709 | 5/1949 | MacMillan | 123/435 |
| 4,002,155 | 1/1977 | Harned et al. | 73/35 |
| 4,012,942 | 3/1977 | Harned | 123/425 |
| 4,116,173 | 9/1978 | McDougal et al. | 123/425 |
| 4,164,867 | 8/1979 | Hickling et al. | 73/35 |
| 4,243,009 | 1/1981 | Staerzl | 123/435 |
| 4,249,494 | 2/1981 | Guipaud | 123/425 |
| 4,290,398 | 9/1981 | Hattori et al. | 123/425 |
| 4,314,534 | 2/1982 | Nakajima et al. | 123/435 |

Primary Examiner—Andrew M. Dolinar
Attorney, Agent, or Firm—Edwin E. Greigg

[57] ABSTRACT

A regulating device is proposed for control variables of an internal combustion engine, in particular for the fuel metering signal and the ignition signal, which has an intervention capability for signals of at least one knocking sensor on the engine via a knocking-signal evaluation circuit; this knocking-signal evaluation circuit includes a frequency recognition circuit and preferably an amplitude recognition circuit, and it detects and evaluates the knocking signal only during specific times or angles relating to the ignition signal. The frequency recognition circuit is realized by means of two counters. The counting range of the first counter marks the value of the upper threshold frequency which can be recognized, while the counting range of the second counter characterizes the frequency band. Finally, by means of a third counter, a specific disturbance interval can be established, in order to cause the frequency recognition circuit to respond only after the appearance of a predetermined number of pulses of the predetermined frequency, thus bringing about an adjustment of the control variables.

10 Claims, 7 Drawing Figures

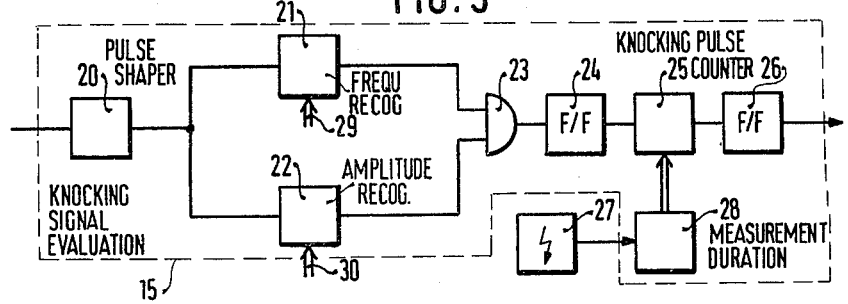
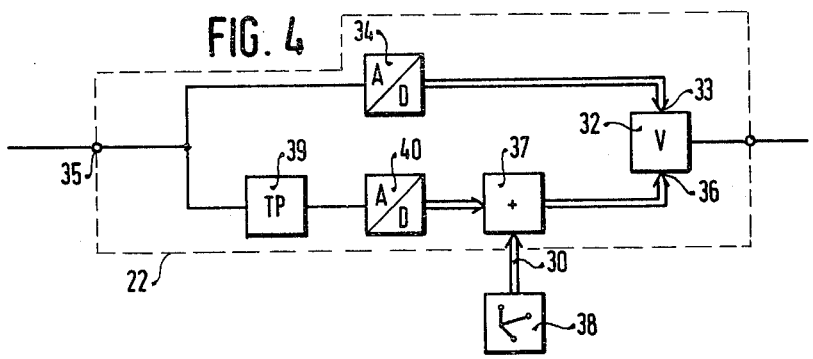
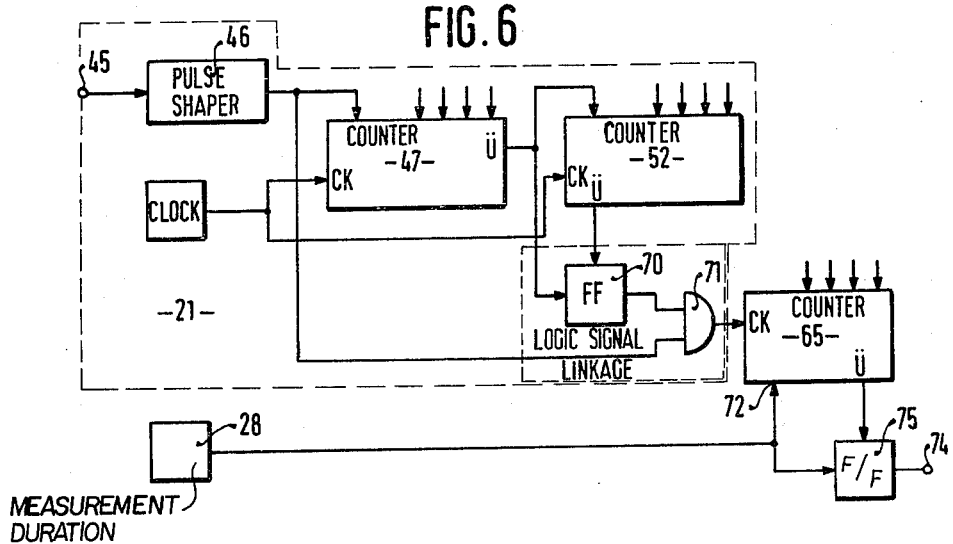

REGULATING DEVICE FOR CONTROL VARIABLES OF AN INTERNAL COMBUSTION ENGINE

BACKGROUND OF THE INVENTION

The invention is based on a regulating device for control of variables of an internal combustion engine and more particularly relates to providing an intervention capability responsive to knocking signals for developing frequency and amplitude information for evaluation to control ignition adjustment or ignition onset.

A motor vehicle ignition system of the prior art is known which evaluates signals of a knocking sensor for the purpose of adjusting the instant of ignition; this is accomplished in such a fashion that as knocking becomes more pronounced, the instant of ignition is adjusted toward "late". In this known regulating device for the instant of ignition, the signal of a knocking sensor is evaluated directly. It has now been demonstrated that the known device is extremely vulnerable to disturbance voltage variables and responses, and it is thus found to be incapable of producing reliable results.

OBJECT AND SUMMARY OF THE INVENTION

It is an object and advantage of the invention to provide a regulating device for control variables of an internal combustion engine having the advantage over the prior art that disturbance variables which occur arbitrarily are to the greatest possible extent without influence on the variable to be regulated. Optimal operation of the internal combustion engine is thus assured.

During the course of the work leading to the invention, the combination of characteristics of the system of the invention has proved to be particularly suitable. By applying these characteristics, it is possible to attain the desired precise results on the part of a regulating device.

The invention has as its object the filtering out of the individual peaks in the course of the pressure which occur in the trailing edge of the pressure signal, then appropriately preparing and evaluating them, and finally, in accordance therewith, adjusting the individual control variables of the engine, especially the fuel metering and the instant of ignition. The goal is to keep combustion in the individual cylinders as close as possible to the knocking limit, for reasons of economy.

The invention will be better understood and further objects and advantages thereof will become more apparent from the ensuing detailed description of preferred embodiments taken in conjunction with the drawings.

BRIEF DESCRIPTION OF THE DRAWINGS

FIG. 3 is a block circuit diagram of the regulating device itself;

FIGS. 4, 5 and 6 show details of the regulating device according to FIG. 3; and

DESCRIPTION OF THE PREFERRED EMBODIMENTS

Figure 1:
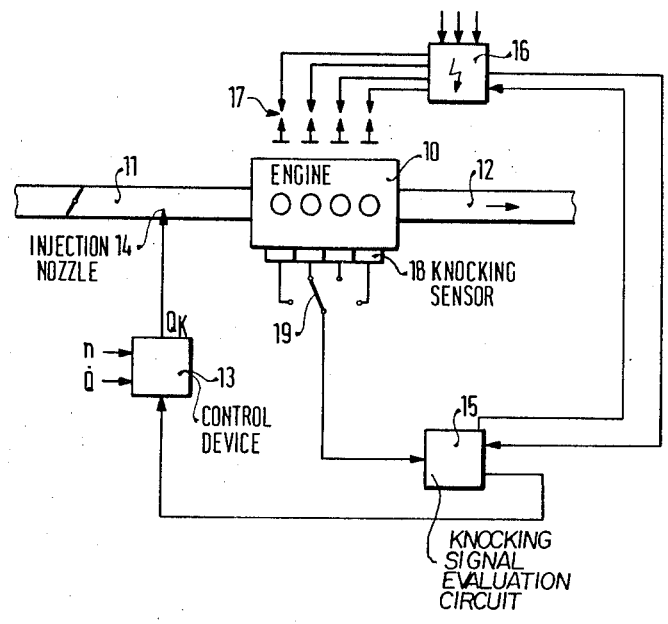
FIG. 1 is a rough schematic representation of the regulating device according to the invention, in combination with an internal combustion engine.

FIG. 1, in a basic schematic layout, shows an internal combustion engine 10 having externally supplied ignition, together with regulating devices for the ignition and for the fuel injection. The internal combustion engine has an intake tube 11 and an exhaust line 12. A fuel metering system includes a control device 13 as well as an injection nozzle 14, the fuel metering signal being determined on the basis of rpm, load and the output signal of a knocking-signal evaluation circuit 15. In corresponding fashion, an ignition system 16 processes various input variables and at the output side sends high-voltage signals to spark plugs 17. The knocking-signal evaluation circuit 15, at its input side, receives signals from knocking sensors 18, of which four are shown in FIG. 1, which can be dialed by means of a switch 19. In this manner, the knocking signals can be ascertained and processed cylinder by cylinder of the internal combustion engine, or in multiplexing operation they may be made available serially to the knocking-signal evaluation circuit 15.

Figure 2:
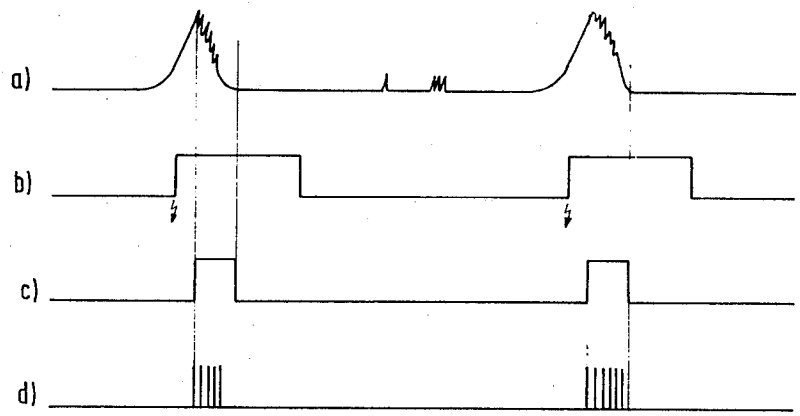
FIG. 2 shows pulse diagrams relating to the signal evaluation.

FIG. 2 contains four diagrams. In FIG. 2a, the pressure in the combustion chamber is plotted over time; FIG. 2b shows the closing-angle signal of the ignition system; FIG. 2c shows a signal for the duration of measurement; and, finally, FIG. 2d shows the knocking signal which has been filtered out of FIG. 2a.

It may be seen in FIG. 2a that there is a zigzag signal course in the trailing edge of the pressure signal. These superimposed peaks are caused by engine knocking; that is, localized ignition cycles in the combustion chamber, and the pressure waves caused thereby, produce this overall course of the pressure signal.

Thus, the invention has as its object the filtering out of the individual peaks in the course of the pressure which occur in the trailing edge of the pressure signal, then appropriately preparing and evaluating them, and finally, in accordance therewith, adjusting the individual control variables of the engine, especially the fuel metering and the instant of ignition. The goal is to keep combustion in the individual cylinders as close as possible to the knocking limit, for reasons of economy.

The so-called knocking frequency, which may be seen in FIG. 2a, for example, is specific for each engine type. For this reason, an exact adaptation of the knocking-signal evaluation circuit to the particular engine type being used is required.

According to FIG. 2d, the knocking frequency signal is filtered out of the signal course according to FIG. 2a and prepared for the purpose of a further signal processing.

One example of a knocking-signal evaluation circuit is shown in FIG. 3. The signal from one or more knocking sensors is present at the input of a pulse-shaper circuit 20. A parallel arrangment of a frequency recognition circuit 21 and an amplitude recognition circuit 22 follows, these being connected at the output side to an AND gate 23. A series circuit comprising the synchronizing flip-flop 24, a knocking pulse counter 25 and a memory flip-flop 26 follows the AND gate 23. The ignition system of the engine is identified by reference numeral 27. One of its output signals controls a measurement-duration circuit or measurement-time control circuit 28, and this circuit, in turn, controls the knocking pulse counter 25 via a second input. Finally, leading to the frequency recognition circuit 21 and the amplitude recognition circuit 22 are the respective multipolar lines 29 and 30, which symbolize control variables for the respective recognition circuit of FIG. 3.

It is essential in the subject of the application that the output signal of the knocking sensor is examined both as to its frequency and to its amplitude. Only if both variables have attained or exceeded values characteristic of the particular engine being used, and in addition if a predetermined number of knocking signals have occured, is there an intentional manipulation of the control variables of the engine. In the case of FIG. 1, these are the fuel metering and ignition characteristics.

FIG. 4 shows one example of a digital amplitude recognition circuit, such as may be used in the subject of FIG. 3. It includes a comparison circuit 32. Via a first input 33, input signals are delivered directly to the comparison circuit 32 via a rapidly-functioning analog-digital converter 34 from a terminal point 35, while via a second input 36 the comparison circuit 32 receives a controllable threshold signal. This signal originates in an adding circuit 37, in which the threshold is formed in accordance with a value taken from a performance graph 38 and in accordance with the input variables. A low-pass filter 39 and, in series therewith, a slow analog-digital converter 40 between the input terminal 35 and the adding circuit 37 serve to provide control of the threshold in accordance with the input variables.

By reason of its design, the amplitude recognition circuit 22 substantially produces the curve of the pulse course shown in FIG. 2a, and the individual signal peaks in the trailing edge of this input signal are filtered out and thus put into a form which can be further processed. The values stored in the performance graph 38 are adapted to the particular engine type being used, and they assure that only the peaks in the signal course of FIG. 2a will be detected, in a manner which is as independent as possible of the load status and the rpm of the engine.

Figure 5A:
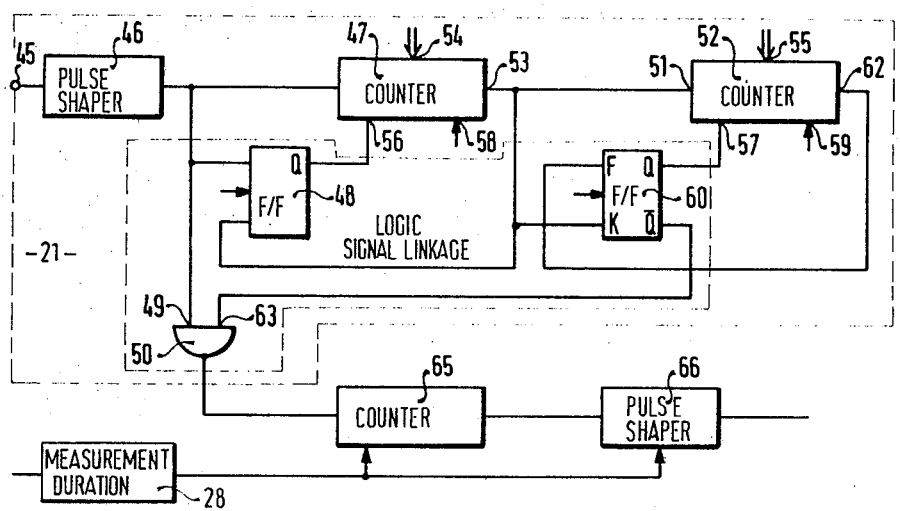

FIG. 5a shows one example of the frequency recognition circuit 21 of FIG. 3, together with a subsequently disposed knocking pulse counter 65. The subject of FIG. 5a, in detail, has the following structure. An input 45 is followed by a pulse-shaper circuit 46, the output of which is connected in turn with the charge input of a counter 47, with the J-input of a JK flip-flop 48, and with a first input 49 of a NAND gate 50. The overflow output 53 of the counter 47 leads to the charge input 51 of a subsequent counter 52, the counter range of which determines the band width of the signal which is to be recognized. The two counters 47 and 52 have multipolar inputs 54 and 55, with which a respective initial counter status may be pre-specified for the counting procedure. Further inputs 56 and 57 are so-called countenable inputs, by way of which the counting process in general can be controlled. The actual counting signal proceeds via inputs 58 and 59 to the counters 47 and 52.

While the Q output of the flip-flop 48 is connected with the counting input 56 of the first counter 47, the Q output of a second JK flip-flop 60 precedes the counting input 57 of the subsequent counter 52. This flip-flop 60, for the F input, receives the output signal from the overflow output 62 of the counter 52, and the K input is connected with both the overflow output 53 of the counter 47 and the K input of the flip-flop 48. A clock signal is received by both flip-flops 48 and 60 via clock lines, indicated by the arrow but not shown in further detail, from a clock signal source.

The second input 63 of the NAND gate 60 receives its signal from the $\overline{Q}$ output of the second flip-flop 60. On the output side, the NAND gate 50 is linked with the counting input of a subsequent counter 65, which is followed in turn by a pulse-shaper circuit 66. Both the counter 65 and the pulse-shaper circuit 66 receive, as a further control signal, a signal which comes by way of example from the measurement-duration circuit 28 according to FIG. 3.

Figure 5B:
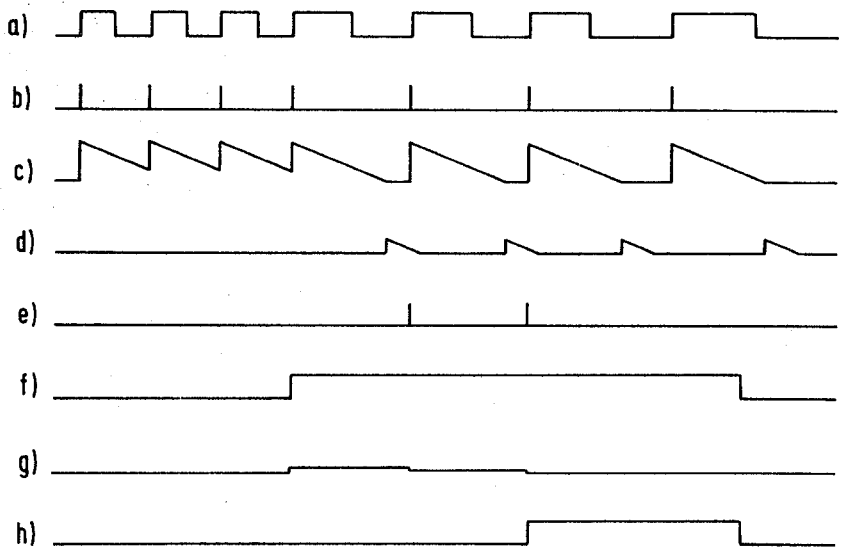

The mode of operation of the subject of FIG. 5a will now be appropriately explained with the aid of the pulse diagrams of FIG. 5b.

In FIG. 5b, the letter a identifies the input signal at the input terminal 45, and b identifies the output signal of the pulse-shaper circuit 46. The counter status in the counter 47 is shown at c, and it becomes clear that with each positive forward edge of the input signal at the input 45, the counter is set to a specific counter status. If the counter status reaches a value of zero, and thus the overflow point, then the counting process ceases, and it is only reinitiated upon the next occurrence of a forward edge. Upon the attainment of a counter status of zero in the first counter, however, the counting process in the second counter 52 is initiated and ended in accordance with signal course d, once this counter has traversed a predetermined range of values. If, during the counting process in the second counter 52, a forward edge in the input signal appears, then this is recognized in terms of the desired input frequency, by means of the NAND gate 50, and an output signal appears which corresponds to e in FIG. 5b. The output signal of the measurement-duration circuit 28 is designated by letter f; this means that the only input signals to be examined as to their frequency are those occuring during the course of the corresponding signal f. The signals according to g are counted in the counter 65; if, for example, two such pulses appear, then an adjustment signal for the ignition is produced according to letter h. The purpose of this delay in response is to prevent disturbance signals which by coincidence have the same frequency as the knocking signal from having any effect.

The pulse diagrams of FIG. 5b make it clear that at an excessively high input frequency, the full counting range of the first counter 47 is never traversed, and thus no overflow pulse appears. This overflow occurs only if the input frequency fails to exceed or attain a specific upper threshold value. This upper threshold value is thus established with the aid of the counting range of the first counter.

The band width of the detectable frequency spectrum may be established by means of the counting range of the second counter. Specifically, an output signal appears only when, upon the appearance of the next input pulse, the first counter is no longer counting, but the second counter is still counting.

If the input frequency fails to attain a lower threshold value, then the forward edge of the next input pulse arrives only after the termination of the counting process in the second counter, and the corresponding logic circuitry no longer emits an output signal.

With the circuit layout shown in FIG. 5a, it is thus possible to interrogate input signals as to the occurrence of a very specific frequency range. Since the knocking frequency in an internal combustion engine is specific for a particular engine type, the occurrence of knocking can be detected quite precisely and processed in an appropriate manner with the proposed circuitry.

A second, somewhat modified exemplary embodiment of a frequency recognition circuit, or more precisely a frequency band recognition circuit, is shown in FIG. 6. Once again, there is the series circuit comprising the pulse-shaper circuit 46 and the first and second counters 47 and 52. The transmit outputs of both counters are carried to a flip-flop 70, the output signal of which, like the output signal of the pulse-shaper circuit 46, is carried to an AND gate 71. Following the AND gate 71 is the counter 65, the output counter status of which corresponds to a pre-selectable disturbance interval, and the charge input 72 of which is furnished with the output signal of the measurement-duration circuit 28. With a view to attaining a constant output signal at an output terminal 74, a flip-flop 75 is also furnished with signals from the transmit output of the counter 65 and from the measurement-duration circuit 28. Here, as well, what is essential is that the clock frequency of the counters 47 and 52 is substantially higher than the input frequency at the input terminal 45.

The two subjects of FIGS. 5a and 6 correspond to one another in terms of their fundamental type. What is different between them is solely the manner of signal linkage; the mode of operation and the results produced by the logical signal linkage, however, are identical.

Figure 7:
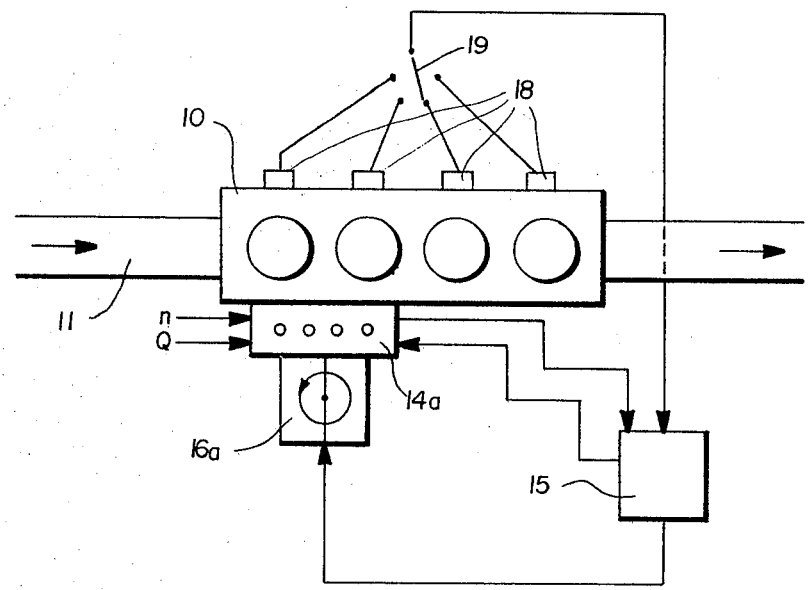
FIG. 7 is a schematic representation of a Diesel engine used with the regulating device of the invention.

It should be added that the invention is not restricted to its application in internal combustion engines having externally supplied ignition; the invention can also be used in Diesel engines having an injection system, such as shown in FIG. 7 in which corresponding elements are designated similar numerical references. In the latter case, the corresponding feature for the ignition signal means 16 is an injection onset control unit 16a, and for the ignition adjustment means 13 it is the adjustment of injection onset fuel quantity control unit 14a.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A regulating device for control variables of an internal combustion engine comprising
   an ignition system having a control means for producing a signal output,
   at least one knocking sensor in the engine producing knocking signal output,
   a knocking-signal evaluation circuit responsive to the signal output of the ignition system and responsive to the knocking signal output of the at least one knocking sensor and producing a fuel metering signal,
   a digital frequency recognition circuit in the knocking-signal evaluation circuit for filtering out from the knocking signal output a knocking frequency signal and producing a corresponding output,
   an amplitude recognition circuit in the knocking-signal evaluation circuit for determining amplitude of the knocking signal output and producing a corresponding output,
   a measurement-time control circuit in the knocking-signal evaluation circuit for producing a duration signal output only during specific times relative to the signal output of the ignition system, and
   means responsive to said duration signal output for acting on the outputs of said frequency recognition circuit and said amplitude recognition.

2. A regulating device as defined by claim 1, wherein the frequency recognition circuit includes two counters disposed in sequence one behind the other, of which the second counter is started whenever the first counter has attained a predetermined counter status and
   a logic unit which ascertains whether an input signal increase from the knocking signal output and a counting process in the second counter occur simultaneously.

3. A regulating device as defined by claim 2, wherein the frequency recognition circuit has a third counter, which emits an output signal whenever a predetermined number of input signals of a predetermined frequency is detected.

4. A regulating device as defined by claim 1, wherein the amplitude recognition circuit has a controllable threshold value switch.

5. A regulating device as defined by claim 4, wherein the threshold value switch is controllable in accordance with an input signal derived from a performance graph means.

6. A regulating device as defined by one of the claims 1, 2, 3, 4 or 5, wherein upon the recognition of knocking, the ignition system is adjusted by said measurement time control circuit toward "late".

7. A regulating device as claimed in claim 6, wherein upon the recognition of knocking, the metering of the fuel is increased by said control means.

8. A regulating device for control variables of an internal combustion engine comprising
   an injection system having a fuel quantity control means and an injection onset control means for producing a signal output,
   at least one knocking sensor in the engine producing knocking signal output,
   a knocking-signal evaluation circuit responsive to the signal output of the injection system and responsive to the knocking signal output of the at least one knocking sensor and producing a fuel metering signal,
   a digital frequency recognition circuit in the knocking-signal evaluation circuit for filtering out from the knocking signal output a knocking frequency signal and producing a corresponding output,
   an amplitude recognition circuit in the knocking-signal evaluation circuit for determining amplitude of the knocking signal output and producing a corresponding output,
   a measurement-time control circuit in the knocking-signal evaluation circuit for producing a duration signal output only during specific times relative to the injection onset signal of the injection system, and
   means responsive to said duration signal output for acting on the outputs of said frequency recognition circuit and said amplitude recognition circuit.

9. A regulating device as defined by claim 8, wherein upon recognition of knocking, the injection system is adjusted by said measurement time control circuit such that the combustion in the cylinders takes place as closely as possible to the knocking limit.

10. A regulating device as defined by claim 8, wherein upon recognition of knocking, the metering of fuel is adjusted by said fuel quantity control means such that the combustion in the cylinders takes place as closely as possible to the knocking limit.

* * * * *